United States Patent
Masunaga et al.

(10) Patent No.: US 10,756,567 B2
(45) Date of Patent: Aug. 25, 2020

(54) UNINTERRUPTIBLE POWER SUPPLY DEVICE

(71) Applicant: TOSHIBA MITSUBISHI-ELECTRIC INDUSTRIAL SYSTEMS CORPORATION, Chou-ku (JP)

(72) Inventors: Hiroshi Masunaga, Chuo-ku (JP); Akihiro Yamanishi, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 304 days.

(21) Appl. No.: 15/772,163

(22) PCT Filed: Nov. 27, 2015

(86) PCT No.: PCT/JP2015/083357
§ 371 (c)(1),
(2) Date: Apr. 30, 2018

(87) PCT Pub. No.: WO2017/090174
PCT Pub. Date: Jun. 1, 2017

(65) Prior Publication Data
US 2018/0316216 A1     Nov. 1, 2018

(51) Int. Cl.
*H02J 9/06* (2006.01)
*G06F 1/26* (2006.01)
(Continued)

(52) U.S. Cl.
CPC .............. *H02J 9/062* (2013.01); *G06F 1/263* (2013.01); *G06F 1/28* (2013.01); *G06F 1/30* (2013.01);
(Continued)

(58) Field of Classification Search
CPC .... G06F 1/263; G06F 1/28; G06F 1/30; H02J 3/38; H02J 7/085; H02J 9/062;
(Continued)

(56) References Cited

U.S. PATENT DOCUMENTS

2010/0110731 A1* 5/2010 Murai ................ H02J 9/062
                                                             363/15
2016/0373017 A1* 12/2016 Mima .................. H02J 9/06

FOREIGN PATENT DOCUMENTS

| JP | 6-253549 A | 9/1994 |
|----|------------|--------|
| JP | 2004-15919 A | 1/2004 |
| JP | 2005-295665 | 10/2005 |

OTHER PUBLICATIONS

Office Action dated Jul. 12, 2019 in corresponding Korean Patent Application No. 10-2018-7017499 (with English Translation), 12 pages.

(Continued)

*Primary Examiner* — Rexford N Barnie
*Assistant Examiner* — Elim Ortiz
(74) *Attorney, Agent, or Firm* — Oblon, McClelland, Maier & Neustadt, L.L.P.

(57) ABSTRACT

When an abnormality occurs in a first voltage detector (4a), a control circuit (7) in an uninterruptible power supply device controls an inverter (3) in synchronization with an output signal (VI2D) from a second voltage detector (4b) to match a phase of a two-phase AC voltage (VO1, VO2) output from the inverter (3) with a phase of a two-phase AC voltage (VI1, VI2) supplied from a commercial AC power supply (51), and then turns on a semiconductor switch pair (S9, S10) and a bypass switch pair (S7, S8). Accordingly, even when an abnormality occurs in the first voltage detector (4a), the two-phase AC voltage can be supplied to a load (53) without instantaneous interruption.

7 Claims, 13 Drawing Sheets

(51) Int. Cl.
    *H02J 7/08*     (2006.01)
    *H02J 3/38*     (2006.01)
    *H02M 3/335*     (2006.01)
    *H02M 7/48*     (2007.01)
    *G06F 1/30*     (2006.01)
    *G06F 1/28*     (2006.01)
    *H02M 5/458*     (2006.01)
    *H02M 3/44*     (2006.01)

(52) U.S. Cl.
    CPC ................ *H02J 3/38* (2013.01); *H02J 7/085* (2013.01); *H02M 5/458* (2013.01); *H02M 7/4807* (2013.01); *H02M 3/33584* (2013.01); *H02M 3/44* (2013.01)

(58) Field of Classification Search
    CPC .. H02M 5/458; H02M 5/4585; H02M 7/4807; H02M 7/5387; H02M 3/33584; H02M 3/44

See application file for complete search history.

(56) References Cited

OTHER PUBLICATIONS

International Search Report dated Mar. 1, 2016 in PCT/JP2015/083357 filed Nov. 27, 2015.

\* cited by examiner (a) INVERTER POWER FEEDING (b) OCCURRENCE OF ABNORMALITY (SYNCHRONIZE VO1 WITH VI1)

(a) DISCHARGE CUT-OFF (b) BYPASS POWER FEEDING (a) INVERTER POWER FEEDING (b) OCCURRENCE OF ABNORMALITY (CANNOT SYNCHRONIZE VO1 WITH VI1)

(a) DISCHARGE CUT-OFF (STOP POWER FEEDING)

(b) BYPASS POWER FEEDING

UNINTERRUPTIBLE POWER SUPPLY DEVICE

TECHNICAL FIELD

The present invention relates to an uninterruptible power supply device, and particularly to an uninterruptible power supply device of a two-phase three-wire type.

BACKGROUND ART

A two-phase three-wire type is a power feeding type in which a two-phase alternating-current (AC) voltage and a neutral point voltage are fed to consumers. In Japan, the phases of the two-phase AC voltage are shifted by 180 degrees from each other, which is referred to as a single-phase three-wire type. An AC voltage in one phase of the two-phase AC voltage and a neutral point voltage are supplied to an electrical device of 100V A two-phase AC voltage is supplied to an electrical device of 200V In North America, a two-phase AC voltage of the three-phase AC voltage is supplied to consumers, and the phases of the two-phase AC voltage are shifted by 120 degrees from each other.

Japanese Patent Laying-Open No. 06-253549 (PTD 1) discloses an uninterruptible power supply device of a single-phase three-wire type. This uninterruptible power supply device includes: a converter configured to convert a two-phase AC voltage supplied from a commercial AC power supply into a direct-current (DC) voltage; and an inverter configured to convert the DC voltage generated by the converter or a DC voltage from a power storage device into a two-phase AC voltage and supply the converted two-phase AC voltage to a load.

CITATION LIST

Patent Document
PTD 1: Japanese Patent Laying-Open No. 06-253549

SUMMARY OF INVENTION

Technical Problem

Such an uninterruptible power supply device is provided with a voltage detector configured to detect an instantaneous value of the two-phase AC voltage from the commercial AC power supply, in which the converter and the inverter are controlled in synchronization with a signal output from the voltage detector. When an abnormality occurs in the voltage detector, the operation of the converter is stopped while the operation of the inverter is continued. Then, the DC voltage from the power storage device is converted into a two-phase AC voltage and supplied to the load. When the voltage across terminals of the power storage device decreases and reaches a discharge cut-off voltage, supply of the two-phase AC voltage from the inverter to the load is stopped. Then, the two-phase AC voltage from the commercial AC power supply is directly supplied to the load through a bypass switch pair.

Accordingly, the conventional uninterruptible power supply device causes a problem that supply of the two-phase AC voltage to the load is instantaneously interrupted when a failure occurs in the voltage detector.

Thus, a main object of the present invention is to provide an uninterruptible power supply device capable of supplying a two-phase AC voltage to a load without instantaneous interruption even when an abnormality occurs in a voltage detector.

Solution to Problem

An uninterruptible power supply device according to the present invention is provided as an uninterruptible power supply device of a two-phase three-wire type. The uninterruptible power supply device includes a converter configured to convert a two-phase AC voltage supplied from a commercial AC power supply into a DC voltage, an inverter configured to convert the DC voltage generated by the converter or a DC voltage supplied from a power storage device into a two-phase AC voltage, and supply the two-phase AC voltage to a load; a bypass switch pair having one terminal pair receiving the two-phase AC voltage from the commercial AC power supply and the other terminal pair connected to the load; a semiconductor switch pair connected in parallel to the bypass switch pair, a first voltage detector and a second voltage detector each configured to detect an instantaneous value of the two-phase AC voltage from the commercial AC power supply, and generate an output signal indicating a detected value; an abnormality detector configured to determine whether the first voltage detector normally functions or not, and generate an output signal indicating a determination result, and a control circuit configured to control the uninterruptible power supply device based on the output signals from the first voltage detector and the second voltage detector and the output signal from the abnormality detector. When the first voltage detector normally functions, the control circuit is configured to turn off the bypass switch pair and the semiconductor switch pair, and control the converter and the inverter in synchronization with the output signal from the first voltage detector. When an abnormality occurs in the first voltage detector, the control circuit is configured to stop an operation of the converter, control the inverter in synchronization with the output signal from the second voltage detector to convert the DC voltage from the power storage device into a two-phase AC voltage, and to match a phase of the two-phase AC voltage with a phase of the two-phase AC voltage from the commercial AC power supply, turn on the bypass switch pair and the semiconductor switch pair when a voltage across terminals of the power storage device decreases and reaches a predetermined voltage, and turn off the semiconductor switch pair after a lapse of a predetermined time period.

Another uninterruptible power supply device according to the present invention is provided as an uninterruptible power supply device of a two-phase three-wire type. The uninterruptible power supply device includes a converter configured to convert a two-phase AC voltage supplied from a commercial AC power supply into a DC voltage, an inverter configured to convert the DC voltage generated by the converter or a DC voltage supplied from a power storage device into a two-phase AC voltage, and supply the two-phase AC voltage to a load; a bypass switch pair having one terminal pair receiving the two-phase AC voltage from the commercial AC power supply and the other terminal pair connected to the load; a semiconductor switch pair connected in parallel to the bypass switch pair, a first voltage detector and a second voltage detector each configured to detect an instantaneous value of an AC voltage in one phase of the two-phase AC voltage from the commercial AC power supply, and generate an output signal indicating a detected value, a third voltage detector configured to detect an instantaneous value of an AC voltage in the other phase of the two-phase AC voltage from the commercial AC power supply, and generate an output signal indicating a detected value, an abnormality detector configured to determine whether the first voltage detector normally functions or not, and generate an output signal indicating a determination result, and a control circuit configured to control the uninterruptible power supply device based on the output signals from the first voltage detector, the second voltage detector and the third voltage detector and the output signal from the abnormality detector. When the first voltage detector normally functions, the control circuit is configured to turn off the bypass switch pair and the semiconductor switch pair, and control the converter and the inverter in synchronization with the output signal from the first voltage detector. When an abnormality occurs in the first voltage detector, the control circuit is configured to stop an operation of the converter, control the inverter in synchronization with the output signal from the second voltage detector to convert the DC voltage from the power storage device into a two-phase AC voltage, and to match a phase of the two-phase AC voltage with a phase of the two-phase AC voltage from the commercial AC power supply, turn on the bypass switch pair and the semiconductor switch pair when a voltage across terminals of the power storage device decreases and reaches a predetermined voltage, and turn off the semiconductor switch pair after a lapse of a predetermined time period.

Advantageous Effects of Invention

In the uninterruptible power supply device according to the present invention, when an abnormality occurs in the first voltage detector, the inverter is controlled in synchronization with the output signal from the second voltage detector to convert the DC voltage from the power storage device into a two-phase AC voltage, and to match a phase of the two-phase AC voltage with the phase of the two-phase AC voltage from the commercial AC power supply, so as to turn on the bypass switch pair and the semiconductor switch pair when the voltage across terminals of the power storage device decreases to a prescribed voltage. Accordingly, even when an abnormality occurs in the first voltage detector, the two-phase AC voltage can be supplied to the load without instantaneous interruption.

DESCRIPTION OF EMBODIMENTS

First Embodiment

Figure 1:
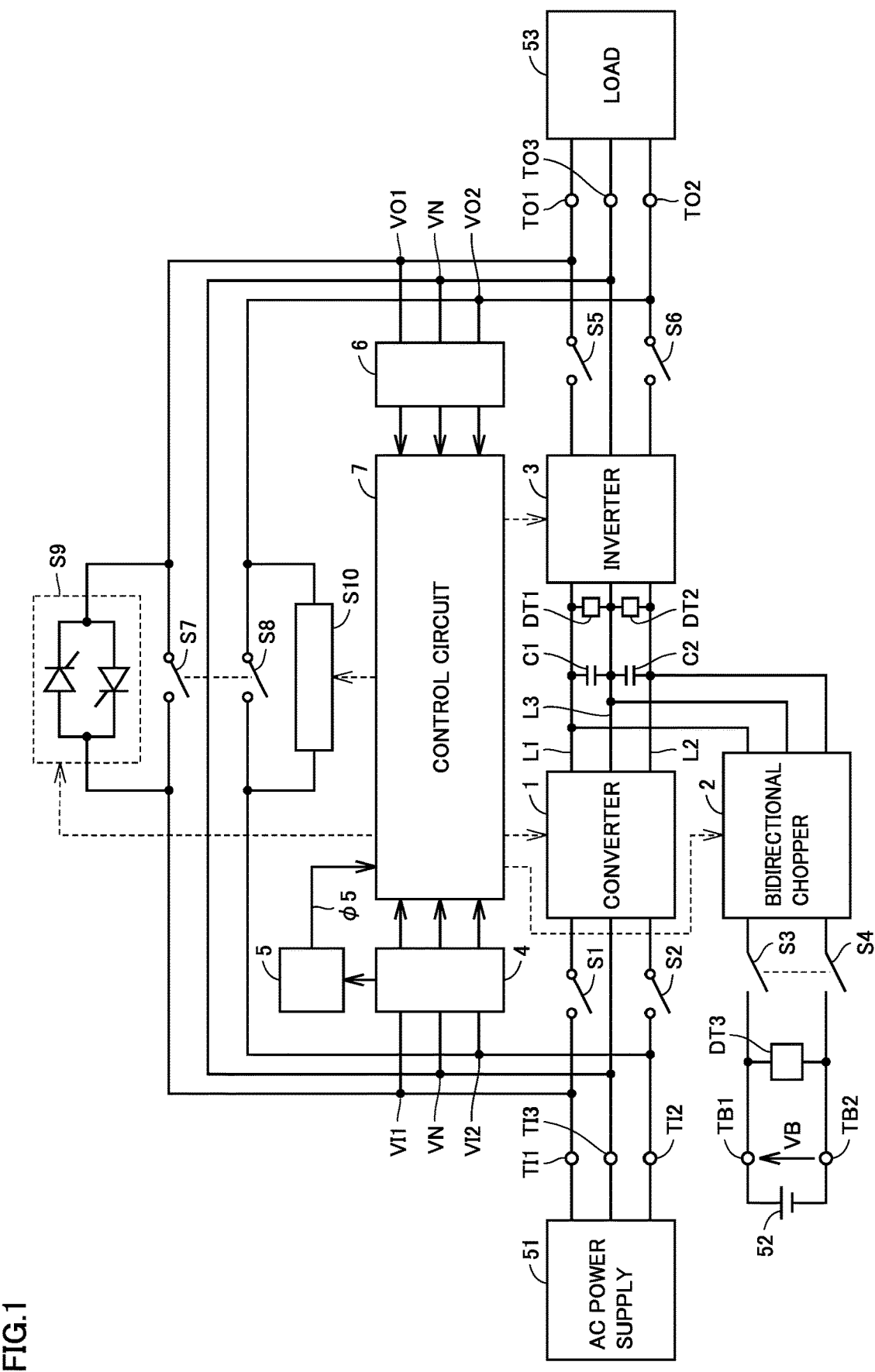
FIG. 1 is a circuit block diagram showing the configuration of an uninterruptible power supply device according to the first embodiment of the present invention

FIG. 1 is a circuit block diagram showing the configuration of an uninterruptible power supply device according to the first embodiment of the present invention. In FIG. 1, this uninterruptible power supply device is of a two-phase three-wire type, and includes input terminals TI1 to TI3, battery terminals TB1, TB2, and output terminals TO1 to TO3. Input terminals TI1, TI2 and TI3 receive an AC voltage VI1, an AC voltage VI2 and a neutral point voltage VN, respectively, that are supplied from a commercial AC power supply 51. For example, in Japan, the phase of AC voltage VI1 is advanced by 180 degrees from the phase of AC voltage VI2. The effective value of each of AC voltages VI1 and VI2 is 100V. Neutral point voltage VN is 0V.

Battery terminals TB1 and TB2 are connected to a positive electrode and a negative electrode, respectively, of a battery 52 (power storage device). A capacitor may be connected in place of battery 52. Output terminals TO1, TO2 and TO3 receive an AC voltage VO1, an AC voltage VO2 and a neutral point voltage VN, respectively, and connected to a load 53. The phase of AC voltage VO1 is advanced by 180 degrees from the phase of AC voltage VO2.

Load 53 includes an electrical device receiving an AC voltage of 100V from output terminals TO1 and TN, another electrical device receiving an AC voltage of 100V from output terminals TO2 and TN, and still another electrical device receiving an AC voltage of 200V from output terminals TO1 and TO2.

This uninterruptible power supply device further includes switches S1 to S8, semiconductor switches S9, S10, a converter 1, a DC positive bus L1, a DC negative bus L2, a DC neutral point bus L3, smoothing capacitors C1. C2. DC voltage detectors DT1 to DT3, a bidirectional chopper 2, an inverter 3, an input voltage detection circuit 4, an abnormality detector 5, an output voltage detection circuit 6, and a control circuit 7.

Switches S1 and S2 have one terminals connected to input terminals TI1 and TI2, respectively, and the other terminals connected to converter 1. Input terminal TI3 is connected to DC neutral point bus L3 through converter 1. Switches S1 and S2 are controlled by control circuit 7 to be: turned on in the normal state where a two-phase AC power is supplied from commercial AC power supply 51, turned off during a power failure in which supply of the two-phase AC power from commercial AC power supply 51 is stopped; and turned off when an abnormality occurs in input voltage detection circuit 4.

Converter 1 is controlled by control circuit 7 to convert the two-phase AC power from commercial AC power supply 51 into DC power in the normal state where the two-phase AC power is supplied from commercial AC power supply 51. In other words, in the normal state, converter 1 generates a positive voltage V 1 and a negative voltage VD2 based on two-phase AC voltages VI1 and VI2 supplied from commercial AC power supply 51. As to converter 1, during a power failure in which supply of the two-phase AC power from commercial AC power supply 51 is stopped, the operation of converter 1 is stopped. When an abnormality occurs in input voltage detection circuit 4, the operation of converter 1 is stopped.

DC positive bus L1 is connected between converter 1 and inverter 3, and positive voltage VD1 is transmitted through this DC positive bus L1. DC negative bus L2 is connected between converter 1 and inverter 3, and negative voltage VD2 is transmitted through this DC negative bus L2. DC neutral point bus L3 is connected between converter 1 and inverter 3, and neutral point voltage VN is transmitted through this DC neutral point bus L3.

Smoothing capacitor C1 is connected between buses L1 and L3, and serves to smooth the voltage between buses L1 and L3. Smoothing capacitor C2 is connected between buses L3 and L2, and serves to smooth the voltage between buses L3 and L2. DC voltage detector DT1 detects a voltage across terminals of smoothing capacitor C1, and outputs a signal indicating the detected value to control circuit 7. The detected value from DC voltage detector DT1 is used for setting the voltage across terminals of smoothing capacitor C to a target capacitor voltage VCT. DC voltage detector DT2 detects a voltage across terminals of smoothing capacitor C2, and outputs a signal indicating the detected value to control circuit 7. The detected value from DC voltage detector DT2 is used for setting the voltage across terminals of smoothing capacitor C2 to target capacitor voltage VCT.

Switches S3 and S4 have one terminals connected to battery terminals TB1 and TB2, respectively, and have the other terminals connected to buses L1 to L3 through bidirectional chopper 2. Switches S3 and S4 are turned on when the uninterruptible power supply device is used and turned off during the maintenance of the uninterruptible power supply device and battery 52, for example.

DC voltage detector DT3 detects a voltage VB across terminals of battery 52, and outputs a signal indicating the detected value to control circuit 7. The detected value from DC voltage detector DT3 is used for setting voltage VB across terminals of battery 52 to target battery voltage VBT during charging of battery 52 and used for detecting that voltage VI across terminals of battery 52 has reached a discharge cut-off voltage VBL.

Bidirectional chopper 2 is controlled by control circuit 7 to store the DC power generated by converter 1 in battery 52 in the normal state where the two-phase AC power is supplied from commercial AC power supply 51. Bidirectional chopper 2 supplies the DC power of battery 52 to inverter 3 during a power failure in which supply of the two-phase AC power from commercial AC power supply 51 is stopped, and at the time when an abnormality occurs in input voltage detection circuit 4.

In other words, bidirectional chopper 2 causes a DC current to flow from each of capacitors C1 and C2 through battery 52 to set voltage VI across terminals of battery 52 to target battery voltage VBT. During a power failure and at the time when an abnormality occurs in input voltage detection circuit 4, bidirectional chopper 2 causes a current to flow from battery 52 through each of capacitors C1 and C2 to set the voltage across terminals on each of capacitors C1 and C2 to target capacitor voltage VCT.

When voltage VB across terminals of battery 52 decreases and reaches discharge cut-off voltage VBL while the DC power of battery 52 is discharged toward capacitors C1 and C2, bidirectional chopper 2 stops supply of the DC power from battery 52 toward capacitors C1 and C2.

Inverter 3 is controlled by control circuit 7 to convert the DC power generated by converter 1 into a two-phase AC power in the normal state where the two-phase AC power is supplied from commercial AC power supply 51. During a power failure and at the time when an abnormality occurs in input voltage detection circuit 4, inverter 3 converts the DC power supplied from battery 52 through bidirectional chopper 2 into a two-phase AC power.

In other words, in the normal state, inverter 3 generates two-phase AC voltages VO1 and VO2 based on positive voltage VD1, negative voltage VD2 and neutral point voltage VN that are supplied through buses L1, L2 and L3, respectively, from converter 1. During a power failure and at the time when an abnormality occurs in input voltage detection circuit 4, inverter 3 generates two-phase AC voltages VO1 and VO2 based on positive voltage VD1, negative voltage VD2 and neutral point voltage VN that are supplied through buses L1, L2 and L3, respectively, from bidirectional chopper 2.

Switches S5 and S6 have one terminals connected to inverter 3 and the other terminals connected to output terminals TO1 and TO2, respectively. Output terminal TO3 is connected to DC neutral point bus L3 through inverter 3. Switches S5 and S6 are controlled by control circuit 7 to be turned on in an inverter power feeding mode in which the two-phase AC power generated by inverter 3 is supplied to load 53, and turned off in a bypass power feeding mode in which the two-phase AC power from commercial AC power supply 51 is directly supplied to load 53.

Figure 2:
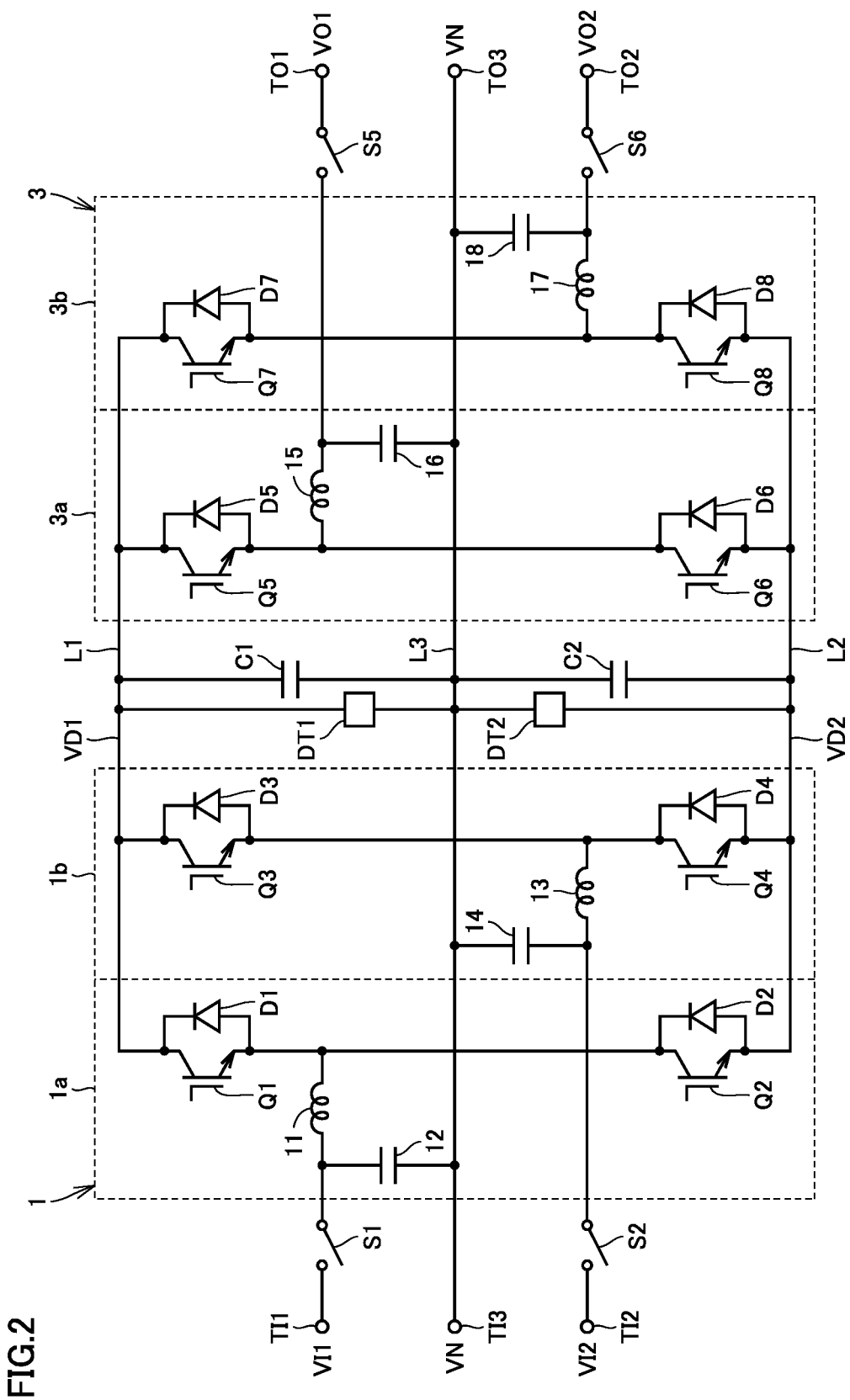
FIG. 2 is a circuit diagram showing the configurations of a converter and an inverter that are shown in FIG. 1.

Then, converter 1 and inverter 3 will be hereinafter described in detail. As shown in FIG. 2, converter 1 includes rectification circuits 1a and 1b, and inverter 3 includes inversion circuits 3a and 3b Rectification circuit 1a includes transistors Q1. Q2, diodes D1, D2, a reactor 11, and a capacitor 12. Rectification circuit 1b includes transistors Q3, Q4, diodes D3, D4, a reactor 13, and a capacitor 14. Inversion circuit 3a includes transistors Q5, Q6, diodes D5, 06, a reactor 15, and a capacitor 16. Inversion circuit 3b includes transistors Q7, Q8, diodes D7, D8, a reactor 17, and a capacitor 18. Each of transistors Q1 to Q8 is an insulated gate bipolar transistor (IGBT), for example.

Collectors of transistors Q1, Q3, Q5, and Q7 are connected to DC positive bus L1. Emitters of transistors Q1, Q3, Q5, and Q7 are connected to collectors of transistors Q2, Q4, Q6, and Q8, respectively. Emitters of transistors Q2, Q4, Q6, and Q8 are connected to DC negative bus L2. Each of transistors Q1 to Q8 is pulse-width-modulation (PWM) controlled by control circuit 7. Each of diodes D1 to D8 is connected in anti-parallel to a corresponding one of transistors Q1 to Q8.

Reactors 11 and 13 have one terminals connected to emitters of transistors Q1 and Q3, respectively, and the other terminals connected to the other terminals of switches S1 and S2, respectively, and also connected to DC neutral point bus L3 through capacitors 12 and 14, respectively. Reactors 15 and 17 have one terminals connected to emitters of transistors Q5 and Q7, respectively, and the other terminals connected to one terminals of switches S5 and S6, respectively, and also connected to DC neutral point bus L3 through capacitors 16 and 18, respectively.

In rectification circuit 1a, when transistor Q1 is turned on in a time period during which AC voltage VI1 supplied from commercial AC power supply 51 to input terminal TI1 is a positive voltage, a current flows through a path extending through input terminal TI1, switch S1, reactor 11, transistor Q1. DC positive bus L1, capacitor C1, DC neutral point bus L3, and input terminal TI3. Thereby, capacitor C1 is charged and positive DC voltage VD1 is supplied to DC positive bus L1.

When transistor Q2 is turned on in a time period during which AC voltage VI1 supplied from commercial AC power supply 51 to input terminal TI1 is a negative voltage, a current flows through a path extending through input terminal TI3, DC neutral point bus L3, capacitor C2, DC negative bus L2, transistor Q2, reactor 11, switch S1, and input terminal TI1. Thereby, capacitor C2 is charged and negative DC voltage VD2 is supplied to DC negative bus L2.

Reactor 11 and capacitor 12 constitute a low-pass filter, which allows AC voltage VI1 having a commercial frequency supplied from commercial AC power supply 51 to pass through transistors Q1 and Q2, and which prevents the signal having a switching frequency generated in each of transistors Q1 and Q2 from passing therethrough to the commercial AC power supply 51 side.

In rectification circuit 1b, when transistor Q3 is turned on in a time period during which AC voltage VI2 supplied from commercial AC power supply 51 to input terminal TI2 is a positive voltage, a current flows through a path extending through input terminal TI2, switch S2, reactor 13, transistor Q3, DC positive bus L1, capacitor C1. DC neutral point bus L3, and input terminal TI3. Thereby, capacitor C1 is charged and positive DC voltage VD is supplied to DC positive bus L1.

When transistor Q4 is turned on in a time period during which AC voltage VI2 supplied from commercial AC power supply 51 to input terminal TI2 is a negative voltage, a current flows through a path extending through input terminal TI3, DC neutral point bus L3, capacitor C2, DC negative bus L2, transistor Q4, reactor 13, switch S2, and input terminal TI2. Thereby, capacitor C2 is charged and negative DC voltage VD2 is supplied to DC negative bus L2.

Reactor 13 and capacitor 14 constitute a low pass filter, which allows AC voltage VI2 having a commercial frequency supplied from commercial AC power supply 51 to pass through transistors Q3 and Q4, and which prevents the signal having a switching frequency generated in each of transistors Q3 and Q4 from passing therethrough to the commercial AC power supply 51 side.

Rectification circuit 1a converts AC voltage VI1 into DC voltages VD1 and VD2, and converts AC power into DC power. Rectification circuit 1b converts AC voltage VI2 into DC voltages VD1 and VD2, and converts AC power into DC power.

In inversion circuit 3a, when transistor Q5 is turned on, a positive current flows through a path extending through DC positive bus L1, transistor Q5, reactor 15, switch S5, output terminal TO1, load 53, output terminal TO3, and DC neutral point bus L3. In contrast, when transistor Q6 is turned on, a negative current flows through a path extending through DC negative bus L2, transistor Q6, reactor 15, switch S5, output terminal TO1, load 53, output terminal TO3, and DC neutral point bus L3.

Reactor 15 and capacitor 16 constitute a low pass filter, which allows AC voltage VO1 having a commercial frequency generated by each of transistors Q5 and Q6 through load 53, and which prevents the signal having a switching frequency generated in each of transistors Q5 and Q6 from passing therethrough to the load 53 side. In other words, reactor 15 and capacitor 16 each serve to convert a rectangular wave-shaped AC voltage generated by turning on and off each of transistors Q5 and Q6 into a sinusoidal wave-shaped AC voltage VO1, and supply the converted AC voltage VO1 to load 53.

In inversion circuit 3b, when transistor Q7 is turned on, a positive current flows through a path extending through DC positive bus L1, transistor Q7, reactor 17, switch S6, output terminal TI2, load 53, output terminal TI3, and DC neutral point bus L3. In contrast, when transistor Q8 is turned on, a negative current flows through a path extending through DC negative bus L2, transistor Q8, reactor 17, switch S6, output terminal TO2, load 53, output terminal TO3, and DC neutral point bus L3.

Reactor 17 and capacitor 18 constitute a low pass filter, which allows AC voltage VO2 having a commercial frequency generated by each of transistors Q7 and Q8 to pass through load 53, and which prevents the signal having a switching frequency generated in each of transistors Q7 and Q8 from passing therethrough to the load 53 side. In other words, reactor 17 and capacitor 18 each serve to convert the rectangular wave-shaped AC voltage generated by turning on and off each of transistors Q7 and Q8 into a sinusoidal wave-shaped AC voltage VO2, and supply the converted AC voltage VO2 to load 53.

Inversion circuit 3a converts DC voltages VD1 and VD2 into AC voltage VO1, and converts DC power into AC power. Inversion circuit 3b converts DC voltages VD1 and VD2 into AC voltage VO2, and converts DC power into AC power.

Referring back to FIG. 1, switches S7 and S8 (bypass switch pair) have one terminals connected to input terminals TI1 and TI12, respectively, and the other terminals connected to output terminals TO1 and TO2, respectively. Semiconductor switches S9 and S10 (semiconductor switch pair) are connected in parallel to switches S7 and S8, respectively. Semiconductor switches S9 and S10 include thyristors connected in anti-parallel with each other, for example. Input terminal TI3 is directly connected to output terminal TO3.

Switches S7 and S8 are controlled by control circuit 7 to be turned off in the inverter power feeding mode in which the two-phase AC power generated by inverter 3 is supplied to load 53, and turned on in the bypass power feeding mode in which the two-phase AC power from commercial AC power supply 51 is directly supplied to load 53.

Semiconductor switches S9 and S10 are turned on by a prescribed time period when the inverter power feeding mode is switched to the bypass power feeding mode. The response speeds of semiconductor switches S9 and S10 are sufficiently higher than the response speeds of switches S7 and S8. Semiconductor switches S9 and S10 are turned on by a prescribed time period, which is for the purpose of preventing semiconductor switches S9 and S10 from being damaged by heat generated in semiconductor switches S9 and S10.

For example, when a failure occurs in inverter 3 in the inverter power feeding mode, semiconductor switches S9 and S10 are instantaneously turned on, and the two-phase AC power from commercial AC power supply 51 is supplied to load 53 through semiconductor switches S9 and S10 Then, switches S7 and S8 with slow response time are turned on, switches S5 and S6 with slow response time are turned off, and then, semiconductor switches S9 and S10 are turned off.

Input voltage detection circuit 4 detects voltages VI1, VI2 and VN on input terminals TI1, TI2 and TI3, respectively, and supplies a signal indicating the detected value to control circuit 7. Abnormality detector 5 determines whether a part corresponding to input voltage VI1 in input voltage detection circuit 4 is normal or not, and outputs a signal φ5 indicating the determination result to control circuit 7. Output voltage detection circuit 6 detects voltages VO1, VO2 and VN on output terminals TO1, TO2 and TO3, respectively, and supplies a signal indicating the detected value to control circuit 7. Control circuit 7 controls the entire uninterruptible power supply device based on the output signals from input voltage detection circuit 4, abnormality detector 5, output voltage detection circuit 6, and IC voltage detectors DT1 to DT3.

Figure 3:
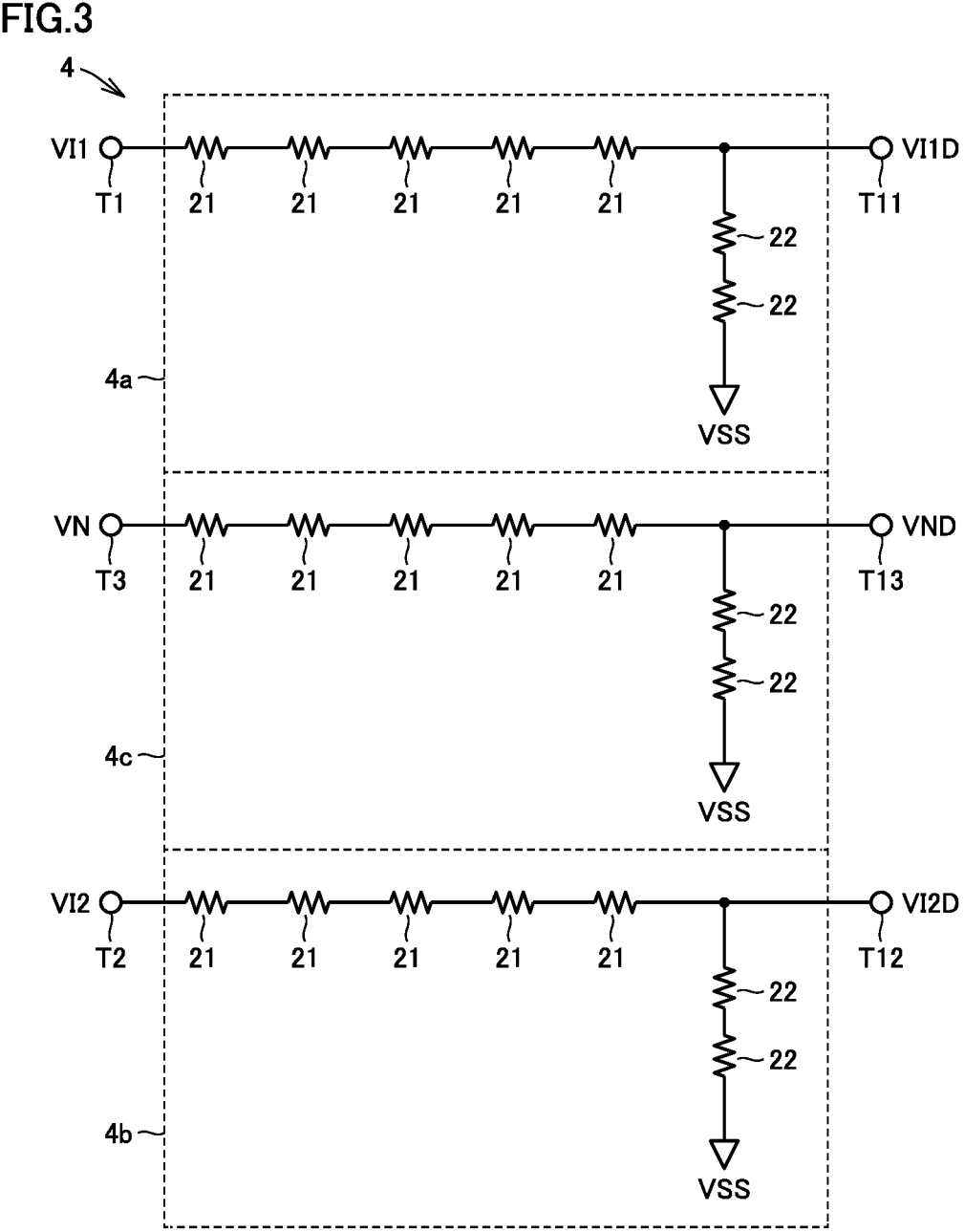
FIG. 3 is a circuit diagram showing the configuration of an input voltage detection circuit shown in FIG. 1.

Specifically, input voltage detection circuit 4 includes input terminals T1 to T3, output terminals TI1 to TI3, and voltage detectors 4a to 4c, as shown in FIG. 3. Input terminals T1, T2 and T3 are connected to input terminals TI1, TI2 and TI3, respectively, and receive an AC voltage VI1, an AC voltage VI2 and a neutral point voltage VN, respectively.

Voltage detector 4a includes: a plurality of (five in the figure) resistance elements 21 connected in series between input terminal T1 and output terminal T11; and a plurality of (two in the figure) resistance elements 22 connected in series between output terminal T11 and the line of reference voltage VSS. An AC voltage VI1D, which is obtained by dividing AC voltage VI1 by a prescribed voltage dividing ratio, appears on output terminal TI1.

Each of voltage detectors 4b and 4c has the same configuration as that of voltage detector 4a. An AC voltage VI2D, which is obtained by dividing AC voltage VI2 by a prescribed voltage dividing ratio, appears on output terminal TI2. A voltage VND, which is obtained by dividing neutral point voltage VN by a prescribed voltage dividing ratio, appears on output terminal T13. Voltages VI1D. VI2D and VND on output terminals T11, T12 and T13 are supplied to control circuit 7 as output signals from voltage detectors 4a. 4b and 4c, respectively.

Output signal VI1D from voltage detector 4a is used for controlling each of transistors Q1 to Q8 included in converter 1 and inverter 3, that is, for controlling the phases of output voltages VO1 and VO2. Output signal VI2D from voltage detector 4b is used for detecting that the effective value of AC voltage VI2 falls outside of the allowable range, that is, for detecting that supply of the two-phase AC power from commercial AC power supply 51 is stopped (that a power failure occurs).

Figure 4:
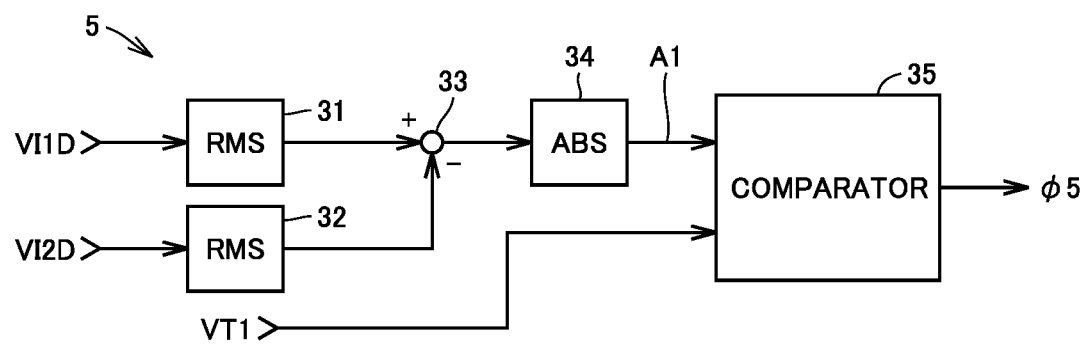
FIG. 4 is a block diagram showing the configuration of an abnormality detector shown in FIG. 1

As shown in FIG. 4, abnormality detector 5 includes effective value calculators (RMS) 31, 32, a subtractor 33, an absolute value calculator (ABS) 34, and a comparator 35. Effective value calculator 31 calculates the effective value of output signal VI1D from voltage detector 4a. Effective value calculator 32 calculates the effective value of output signal VI2D from voltage detector 4b Subtractor 33 calculates the difference between the effective value of signal VI1D calculated by effective value calculator 31 and the effective value of signal VI2D calculated by effective value calculator 32.

Absolute value calculator 34 calculates an absolute value A1 of the difference between the effective value of signal VI1D and the effective value of signal VI2D that are calculated by subtractor 33. Comparator 35 compares absolute value A1 calculated by absolute value calculator 34 and a threshold value VT1. Then, in the case where A1<VT1, comparator 35 sets an abnormality detection signal φ5 at an "L" level as a deactivation level. In the case where A1>VT1, comparator 35 sets abnormality detection signal φ5 at an "H" level as an activation level.

When voltage detectors 4a and 4b normally function, the effective values of signals VID1 and VID2 are the same, so that absolute value A1 becomes zero, in which case A1≤VT1. Thus, abnormality detection signal φ5 turns into an "L" level as a deactivation level. When an abnormality occurs in voltage detector 4a, there occurs a difference between the effective values of signals VID1 and VID2. Thus, absolute value A1 becomes large, which leads to A1>VT1, so that abnormality detection signal φ5 turns into an "H" level as an activation level.

In addition, there is an extremely low possibility that abnormalities occur simultaneously in voltage detectors 4a and 4b. When an abnormality occurs in voltage detector 4b, the effective value of output signal VI2D from voltage detector 4b exceeds the allowable range. Accordingly it is determined that a power failure occurs. Thus, when abnormality detection signal φ5 is turned into an "H" level, an abnormality occurs in voltage detector 4a.

Figure 5:
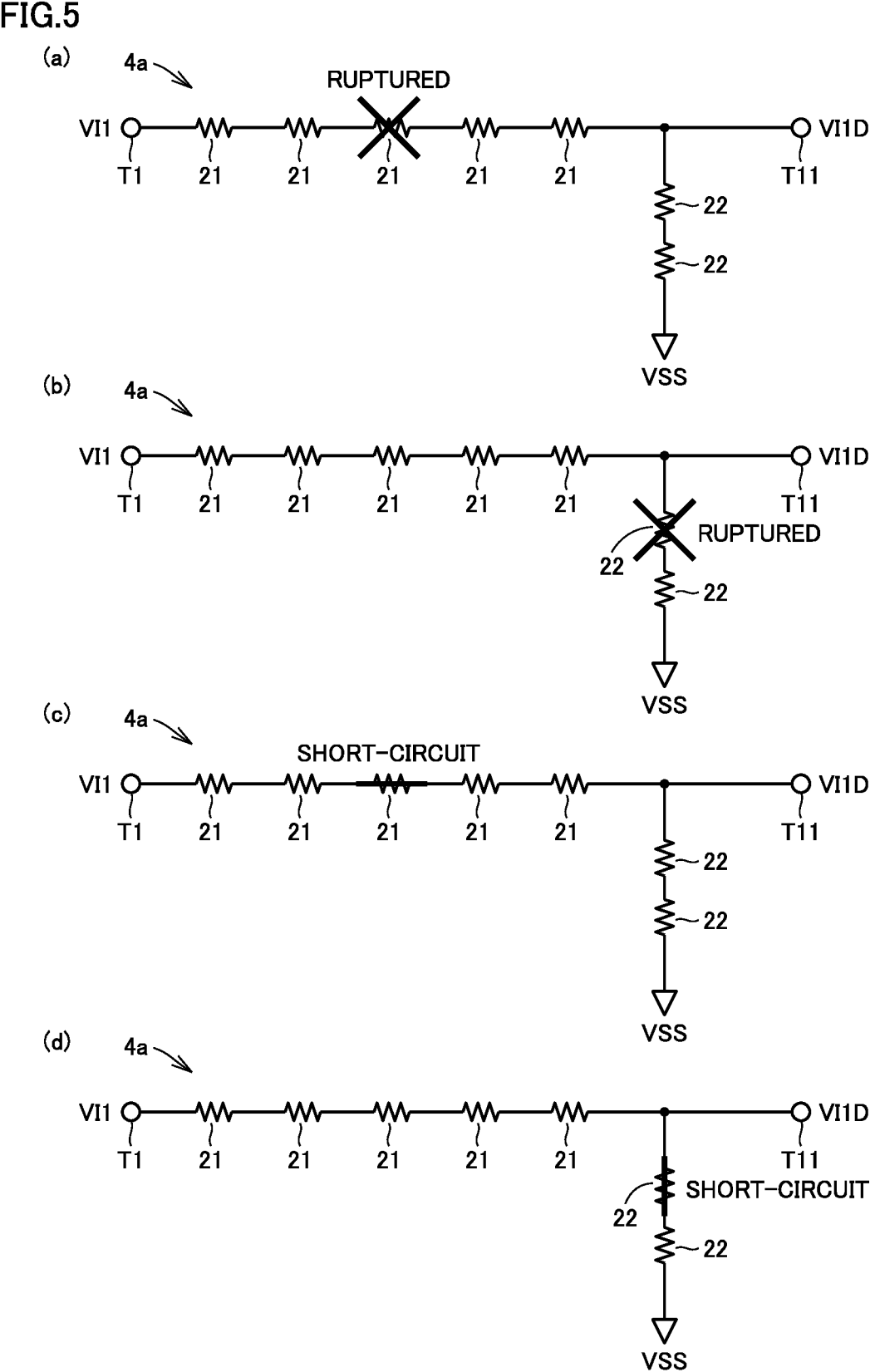
FIG. 5 is a circuit diagram for illustrating an abnormality in the voltage detector shown in FIG. 3.

FIGS. 5(a) to 5(d) each are a diagram showing the state where an abnormality occurs in voltage detector 4a. FIG. 5(a) shows the state where resistance element 21 is ruptured. In this case, signal VI1D becomes 0V. Thus, the effective value of signal VI1D is smaller than that in the state where voltage detector 4a normally functions, so that abnormality detection signal φ5 turns into an "H" level as an activation level. FIG. 5(b) shows the state where resistance element 22 is ruptured. In this case, AC voltage VI1 is output as signal VI1D as it is, the effective value of signal VI1D is larger than that in the state where voltage detector 4a normally functions. Thus, abnormality detection signal φ5 turns into an "H" level as an activation level.

FIG. 5(c) shows the state where a short circuit occurs between the terminals of resistance element 21. In this case, the effective value of signal VI1D is larger than that in the state where voltage detector 4a normally functions, and abnormality detection signal φ5 turns into an "H" level as an activation level FIG. 5(d) shows the state where a short circuit occurs between the terminals of resistance element 22. In this case, the effective value of signal VI1D is smaller than that in the state where voltage detector 4a normally functions, and abnormality detection signal φ5 turns into an "H" level as an activation level.

Figure 6:
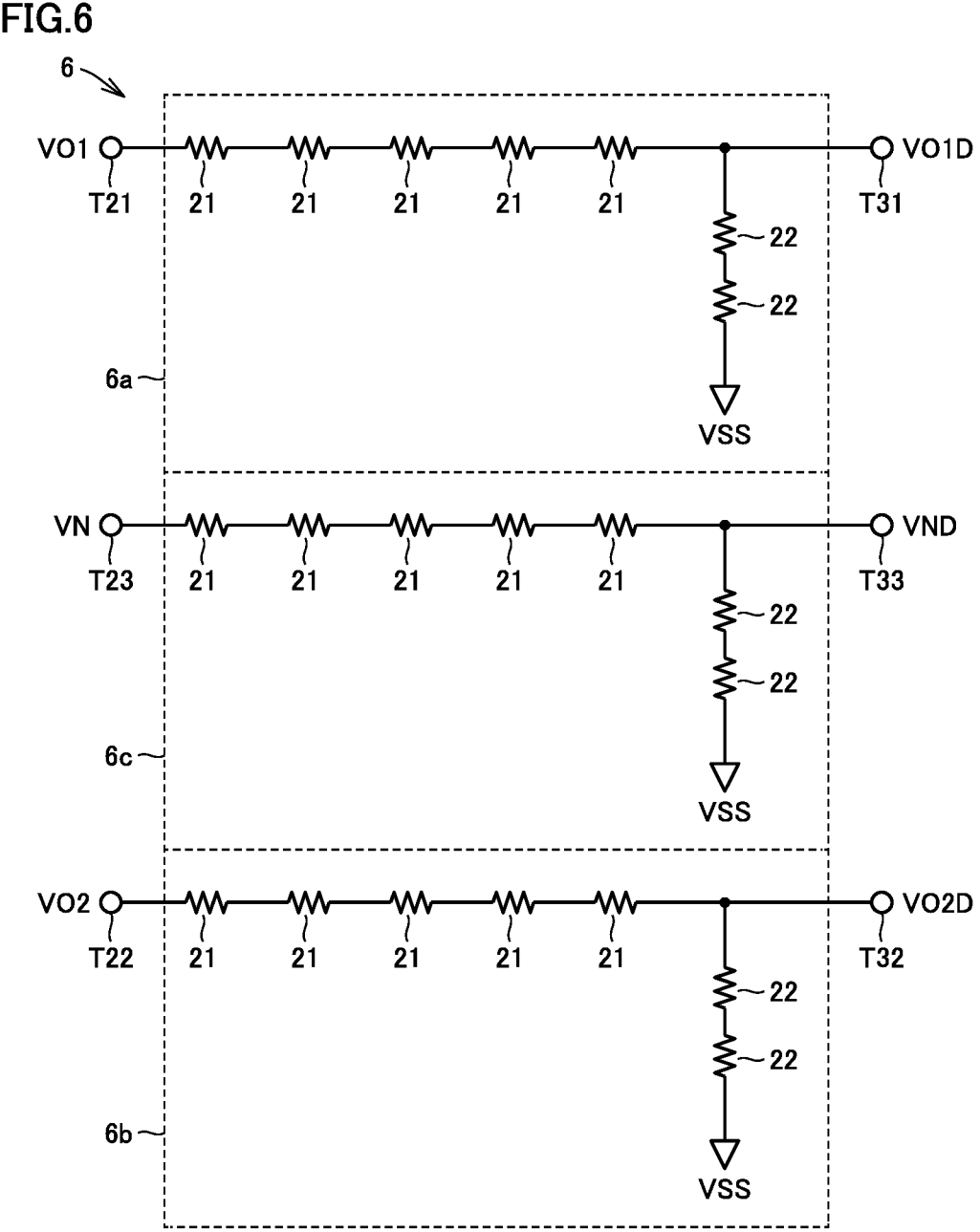
FIG. 6 is a circuit diagram showing the configuration of an output voltage detection circuit shown in FIG. 1.

As shown in FIG. 6, output voltage detection circuit 6 includes input terminals T21 to T23, output terminals T31 to T133, and voltage detectors 6a to 6c. Input terminals T21. T22 and T23 are connected to output terminals TO1, TO2 and TO3, respectively, and receive AC voltage VO1, AC voltage VO2 and neutral point voltage VN, respectively.

Voltage detector 6a includes a plurality of (five in the figure) resistance elements 21 connected in series between input terminal T21 and output terminal T31, and a plurality of (two in the figure) resistance elements 22 connected in series between output terminal T31 and the line of reference voltage VSS. An AC voltage VO1D, which is obtained by dividing AC voltage VO1 by a prescribed voltage dividing ratio, appears on output terminal T21.

Each of voltage detectors 6b and 6c has the same configuration as that of voltage detector 6a. An AC voltage VO2D, which is obtained by dividing AC voltage VO2 by a prescribed voltage dividing ratio, appears on output terminal T32. A voltage VND, which is obtained by dividing neutral point voltage VN by the prescribed voltage dividing ratio, appears on output terminal T33 Voltages VO1D, VO2D and VND on output terminals T31. T32 and T33 are supplied to control circuit 7 as output signals from voltage detectors 6a. 6b and 6c, respectively.

Control circuit 7 controls the entire uninterruptible power supply device based on output signals VI1D, VI2D and VND from voltage detectors 4a, 4b and 4c, output signal φ5 from abnormality detector 5, output signals VO1D. VO2D and VND from voltage detectors 6a, 6b and 6c, output signals from DC voltage detectors DT1, TT2 and DT3.

In other words, when abnormality detection signal φ5 is at an "L" level as a deactivation level in the inverter power feeding mode, control circuit 7 controls converter 1 in synchronization with output signal VI1D from voltage detector 4a to convert AC voltage VI1 into DC voltages VD1 and VD2, and convert AC voltage VI2 into DC voltages VD1 and VD2. In this case, control circuit 7 controls inverter 3 such that the phase of output signal VO1D from voltage detector 6a matches with the phase of output signal VI1D from voltage detector 4a.

When abnormality detection signal φ5 is turned into an "H" level as an activation level in the inverter power feeding mode, control circuit 7 stops the operation of converter 1 to fix each of transistors Q1 to Q4 in the OFF state, so as to turn off switches S1 and S2 Control circuit 7 controls bidirectional chopper 2 to cause each of capacitors C1 and C2 to be charged with DC power of battery 52. Control circuit 7 controls inverter 3 such that the phase of output signal VO1D from voltage detector 6a matches with the phase of the monitor signal obtained by advancing the phase of output signal VI2D from voltage detector 4b by 180 degrees.

When voltage VB across terminals of battery 52 decreases and reaches discharge cut-off voltage VBL, control circuit 7 stops the operation of bidirectional chopper 2, to turn on semiconductor switches S9, S10 and switches S7, S8, and to turn off switches S5 and S6. Thereby, the two-phase AC power from commercial AC power supply 51 is supplied to load 53 without instantaneous interruption.

When a failure occurs in inverter 3 in the inverter power feeding mode, control circuit 7 turns on semiconductor switches S9. S10 and switches S7, S8 and turns off switches S5. S6. Thereby, the two-phase AC power from commercial AC power supply 51 is supplied to load 53 without instantaneous interruption.

When supply of the two-phase AC power from commercial AC power supply 51 is stopped in the inverter power feeding mode (that is, when a power failure occurs), control circuit 7 stops the operation of converter 1 to fix each of transistors Q1 to Q4 in the OFF state, so as to turn off switches S1 and S2. Control circuit 7 controls bidirectional chopper 2 to cause each of capacitors C1 and C2 to be charged with DC power from battery 52.

Control circuit 7 stores the phase of output signal VI1D from voltage detector 4a before occurrence of a power failure. This control circuit 7 controls inverter 3 such that the stored phase of signal VI1D matches with the phase of output signal VO1D from voltage detector 6a. When voltage VB across terminals of battery 52 decreases and reaches discharge cut-off voltage VBL, control circuit 7 stops the operations of bidirectional chopper 2 and inverter 3, to turn off switches S5 and S6. Accordingly, even when a power failure occurs, the operation of load 53 can be continued in the time period during which DC power is stored in battery 52.

Figure 7:
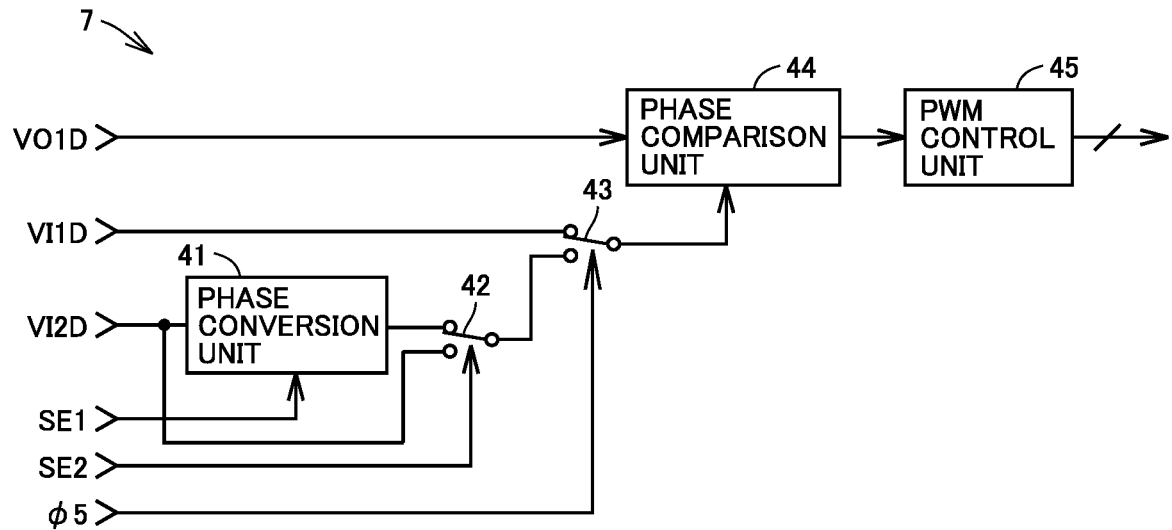
FIG. 7 is a circuit block diagram showing a main part in a control circuit shown in FIG. 1.

FIG. 7 is a block diagram showing a main part in control circuit 7. In FIG. 7, control circuit 7 receives output signal VO1D from voltage detector 6a, output signal VI1D from voltage detector 4a, output signal VI2D from voltage detector 4b, selection signals SE1, SE2, and abnormality detection signal φ5.

Signal VO1D is obtained by dividing output voltage VO1 from inversion circuit 3a by voltage detector 6a, and provided as a signal that varies in a sinusoidal waveform in a commercial frequency. Signal VI1D is obtained by dividing AC voltage VI1 from commercial AC power supply 51 by voltage detector 4a, and provided as a signal that varies in a sinusoidal waveform in a commercial frequency. Signal VI2D is obtained by dividing AC voltage VI2 from commercial AC power supply 51 by voltage detector 4b, and provided as a signal that varies in a sinusoidal waveform in a commercial frequency.

Figure 8:
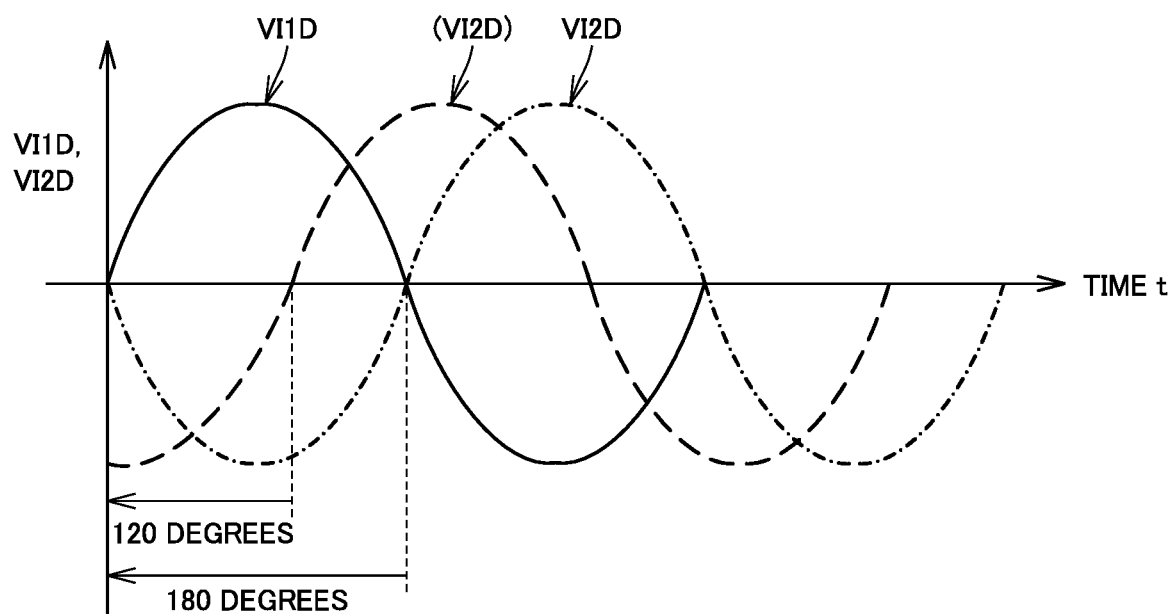
FIG. 8 is a time chart for illustrating the operation of a phase conversion unit shown in FIG. 7
Figure 9:
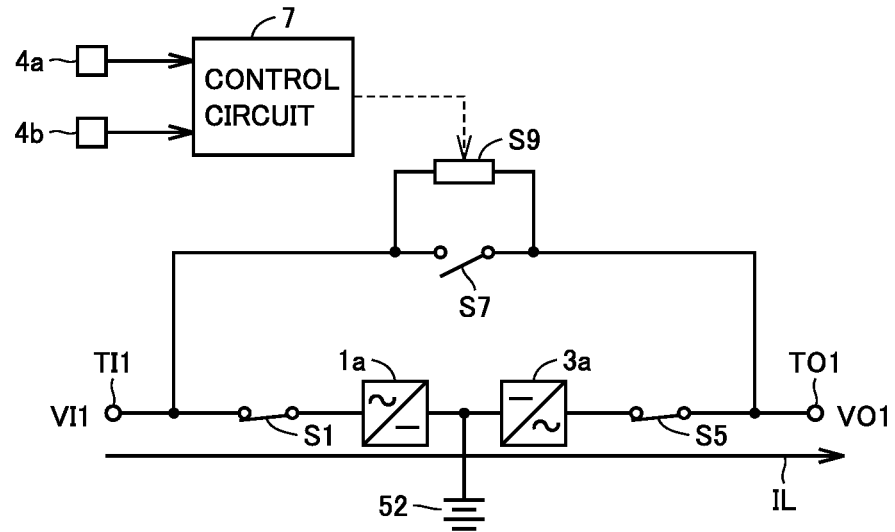
FIG. 9 is a diagram showing the operation of the uninterruptible power supply device shown in FIG. 1.
Figure 9:
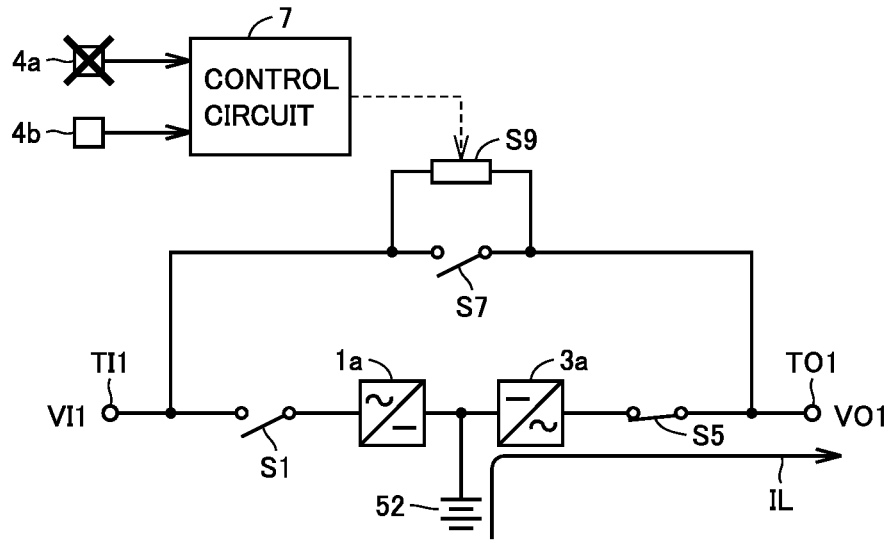
Figure 10:
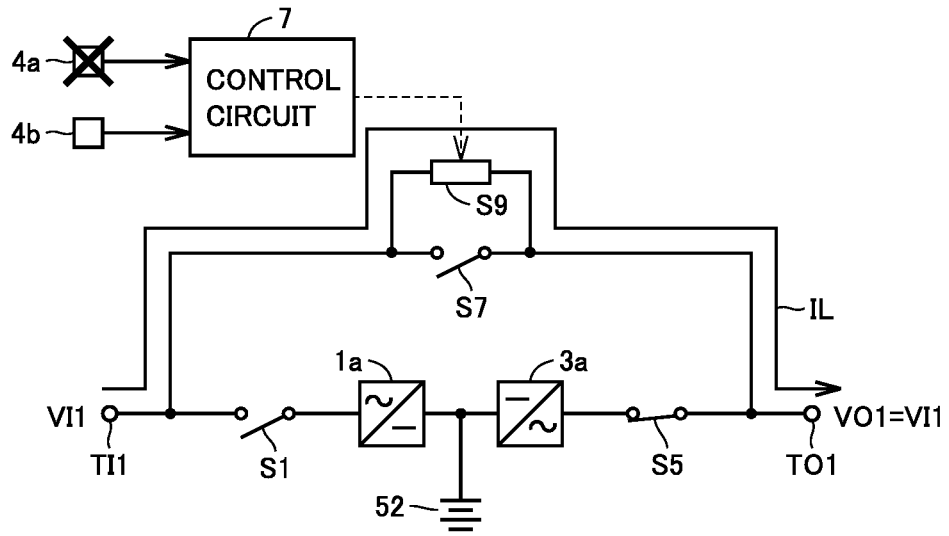
FIG. 10 is another diagram showing the operation of the uninterruptible power supply device shown in FIG. 1.
Figure 10:
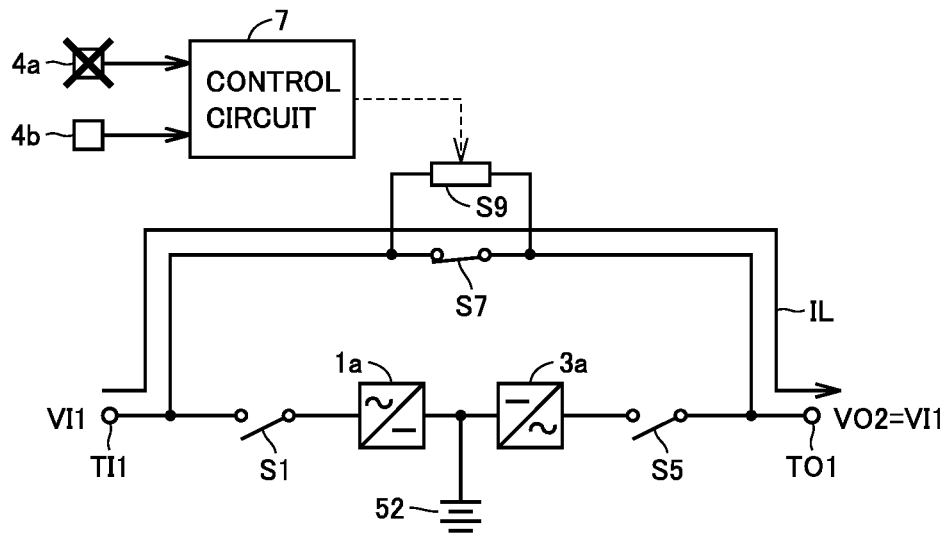

FIG. 8 is a time chart showing waveforms of signals VI1D and VI2D. As shown in FIG. 8, the phase of signal VI2D delays by 180 degrees from the phase of signal VI1D. The phase of signal VI2D is advanced by 180 degrees, so that a monitor signal in phase with signal VI1D can be generated.

In Japan, the phase of signal VI2D delays by 180 degrees from the phase of signal VI D. In North America, the phase of signal VI2D delays by 120 degrees from the phase of signal VI1D, for example. In this case, the phase of signal VI2D is advanced by 120 degrees, so that a monitor signal in phase with signal VI1D can be generated.

Referring back to FIG. 7, selection signal SE is set at an "H" level in Japan, and set at an "L" level in North America Selection signal SE2 serves as a signal used for setting whether the phase of signal VI2D is to be converted or not. In other words, the uninterruptible power supply device in the present first embodiment can also be used as an uninterruptible power supply device of a single-phase two-wire type. In this case, input terminals TI1 and TI2 are connected to each other, and receive AC voltage VI1 from commercial AC power supply 51, and input terminal TI3 receives neutral point voltage VN. Output terminals TO1 and TO2 are connected to each other and used for outputting AC voltage VO1 The load receives AC voltage VO1 from output terminals TO1 and TO2 and receives neutral point voltage VN from output terminal TO3. The load includes an electrical device of 100V.

In this case, since the phase of signal VI1D matches with the phase of signal VI2D, the phase of signal VI2D does not have to be converted. Selection signal SE2 is turned into an "H" level when the phase of signal VI2D is converted, but turned into an "L," level when the phase of signal VI2D is not converted.

As described above, abnormality detection signal φ5 is turned into an "H" level when an abnormality occurs in voltage detector 4a, and turned into an "L" level when an abnormality does not occur in voltage detector 4a.

Control circuit 7 includes a phase conversion unit 41, switching circuits 42 and 43, a phase comparison unit 44, and a PWM control unit 45. When selection signal SE1 is turned into an "H" level for the purpose of allowing an uninterruptible power supply device to be used in Japan, phase conversion unit 41 generates a monitor signal, which is obtained by advancing the phase of output signal VI2D from voltage detector 4b by 180 degrees. When selection signal SE1 is turned into an "L" level for the purpose of allowing an uninterruptible power supply device to be used in North America, phase conversion unit 41 generates a monitor signal, which is obtained by advancing the phase of output signal VI2D from voltage detector 4b by 120 degrees.

Switching circuit 42 receives signal VI2D and the output signal from phase conversion unit 41. Then, when signal SE2 is turned into an "H" level for converting the phase of signal VI2D, switching circuit 42 selects the output signal from phase conversion unit 41 and supplies the selected output signal to switching circuit 43. When signal SE2 is turned into an "L" level since the phase of signal VI2D does not have to be converted, switching circuit 42 selects signal VI2D and supplies the selected signal VI2D to switching circuit 43.

When abnormality detection signal φ5 is turned into an "L" level since voltage detector 4a normally functions, switching circuit 43 supplies signal VI1D to phase comparison unit 44. When abnormality detection signal φ5 is turned into an "H" level since an abnormality occurs in voltage detector 4a, switching circuit 43 supplies the signal supplied from switching circuit 42 to phase comparison unit 44.

Phase comparison unit 44 compares the phase of signal VO1D with the phase of the signal (for example, signal VI1D) supplied from switching circuit 43, and outputs a signal indicating the comparison result. Specifically, phase comparison unit 44 detects a first zero cross point at which signal VO1D becomes 0V when it changes from a negative voltage to a positive voltage and a second zero cross point at which the signal supplied from switching circuit 43 (for example, signal VI1D) becomes 0V when it changes from a negative voltage to a positive voltage. Then, phase comparison unit 44 detects a phase difference Δθ (degree) between the first zero cross point and the second zero cross point, and outputs a signal indicating the detected value.

Based on the output signal from phase comparison unit 44, PWM control unit 45 adjusts the timing at which each of transistors Q5 to Q8 in inverter 3 is turned on/off such that phase difference Δθ between the first zero cross point and the second zero cross point becomes zero degree.

FIGS. 9(a), 9(b) and FIGS. 10(a), 10(b) each are a diagram schematically showing the operation of the uninterruptible power supply device. FIGS. 9 (a), (b) and FIGS. 10 (a), (b) each show only an area related to AC voltage VI1 in one phase for the sake of simplification of illustration and description, but do not show bidirectional chopper 2 and the like.

In FIG. 9(a), when voltage detector 4a normally functions in the inverter power feeding mode, switches S1 and S5 are turned on while switch S7 and semiconductor switch S9 are turned off. Then, a current II, flows from commercial AC power supply 51 to load 53 through input terminal TI1, switch S1, rectification circuit 1a, inversion circuit 3a, switch S5, and output terminal TO1. In this case, control circuit 7 controls inversion circuit 3a in synchronization with output signal VI1D from voltage detector 4a so as to cause the phase of output voltage VO1 from inversion circuit 3a to match with the phase of AC voltage VI1 from commercial AC power supply 51.

In FIG. 9(b), when an abnormality occurs in voltage detector 4a, the operation of rectification circuit 1a is stopped and switch S1 is turned off. Then, current II, flows from battery 52 to load 53 through inversion circuit 3a, switch S5 and output terminal 101. In this case, control circuit 7 controls inversion circuit 3a in synchronization with output signal VI2D from voltage detector 4b in place of voltage detector 4a to cause the phase of output voltage VO1 from inversion circuit 3a to match with the phase of AC voltage VI1 from commercial AC power supply 51.

In FIG. 10(a), when voltage VB across terminals of battery 52 decreases and reaches discharge cut-off voltage VBL, semiconductor switch S9 is instantaneously turned on. Then, current IL flows from commercial AC power supply 51 into load 53 through input terminal TI1, semiconductor switch S9 and output terminal TO1.

In addition, the control electrode of semiconductor switch S9 and the control electrode of switch S7 are simultaneously supplied with signals for turning on these control electrodes. In this case, since the response speed of semiconductor switch S9 is higher than the response speed of switch S7, switch S7 is turned on after semiconductor switch S9 is instantaneously turned on. There may be a time period in which each of semiconductor switch S9 and switch S5 is turned on, and AC power is supplied to load 53 from each of commercial AC power supply 51 and inversion circuit 3a.

In FIG. 10(b), switch S7 is turned on, switch S5 is turned off, and then, semiconductor switch S9 is turned off. Then, current IL flows from commercial AC power supply 51 into load 53 through input terminal TI1, switch S7 and output terminal TO1. In this way, in the present first embodiment, even when an abnormality occurs in voltage detector 4a, the two-phase AC power is supplied to load 53 without instantaneous interruption.

Figure 11:
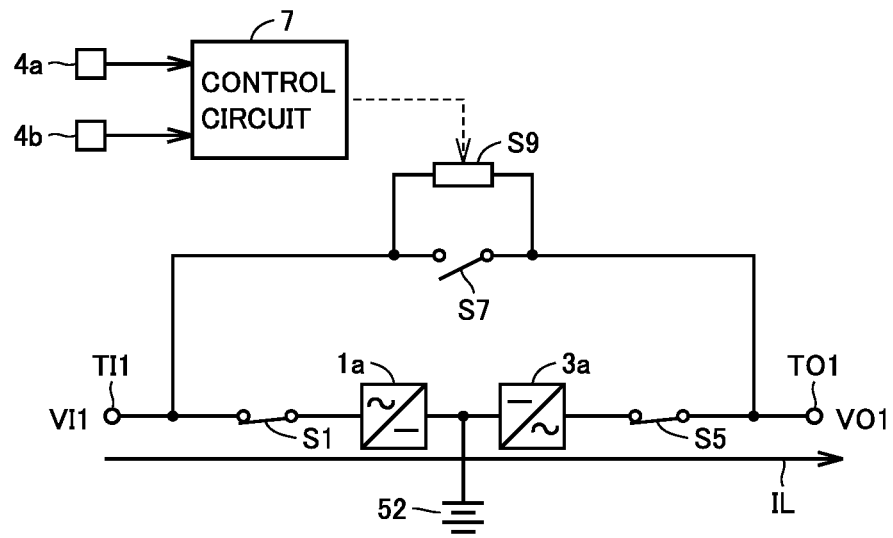
FIG. 11 is a diagram showing the operation of an uninterruptible power supply device provided as a comparative example of the first embodiment.
Figure 11:
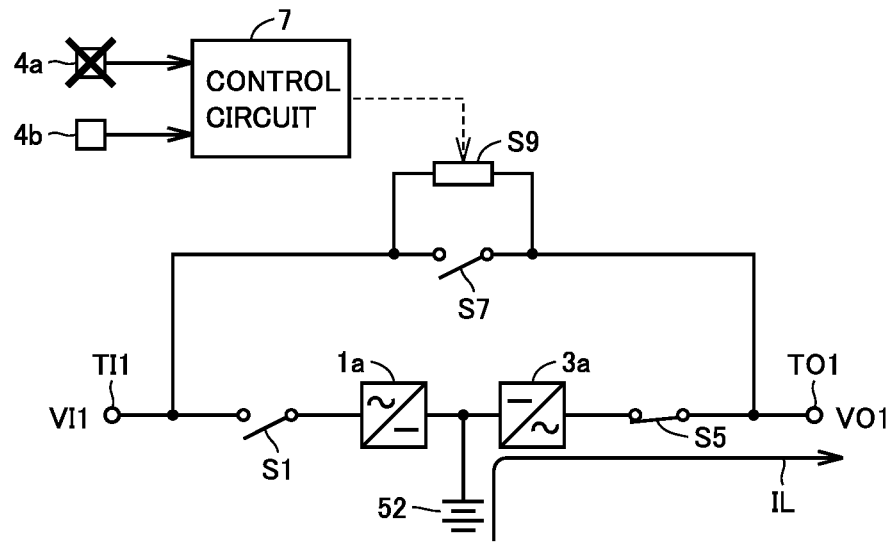

FIGS. 11(a) and 11(b) are diagrams showing comparative examples of the present first embodiment, and illustrated as compared with FIGS. 10(a) and 10(b). In this comparative example, when an abnormality occurs in voltage detector 4a, output signal VI2D from voltage detector 4b cannot be used in place of output signal VI1D from voltage detector 4a.

In FIG. 11(a), the operation performed when voltage detector 4a normally functions in the inverter power feeding mode is the same as that in the first embodiment. Thus, switches S1 and S5 are turned on while switch S7 and semiconductor switch S9 are turned off. Then, current IL flows from commercial AC power supply 51 into load 53 through input terminal TI1, switch S1, rectification circuit 1a, inversion circuit 3a, switch S5, and output terminal TO1. In this case, control circuit 7 controls inversion circuit 3a in synchronization with output signal VI1D from voltage detector 4a to cause the phase of output voltage VO1 from inversion circuit 3a to match with the phase of AC voltage VI1 from commercial AC power supply 51.

In FIG. 11(b), when an abnormality occurs in voltage detector 4a, the operation of rectification circuit 1a is stopped and switch S1 is turned off. Then, current IL flows from battery 52 into load 53 through inversion circuit 3a, switch S5 and output terminal TO1. In this case, control circuit 7 controls inversion circuit 3a based on the phase information stored before occurrence of an abnormality. Accordingly, the phase of output voltage VO1 from inversion circuit 3a cannot be matched with the phase of AC voltage VI1 from commercial AC power supply 51.

Figure 12:
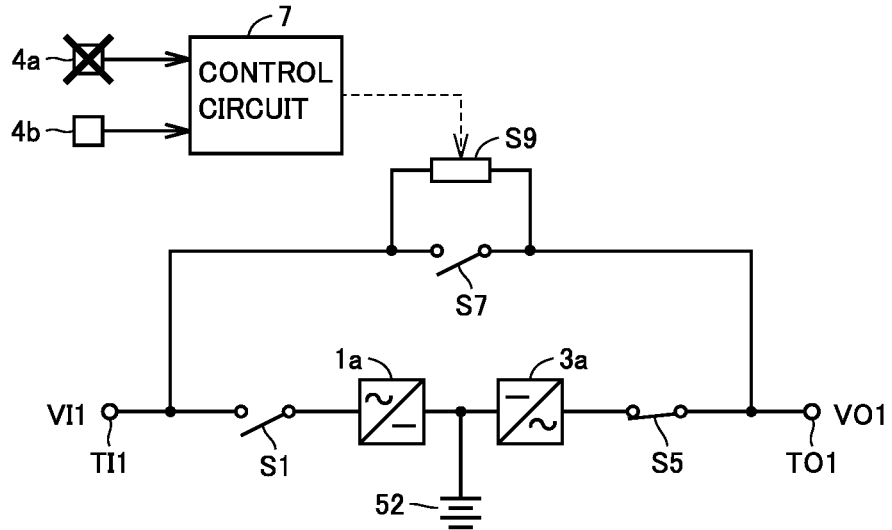
FIG. 12 is another diagram showing the operation of the uninterruptible power supply device provided as a comparative example of the first embodiment.
Figure 12:
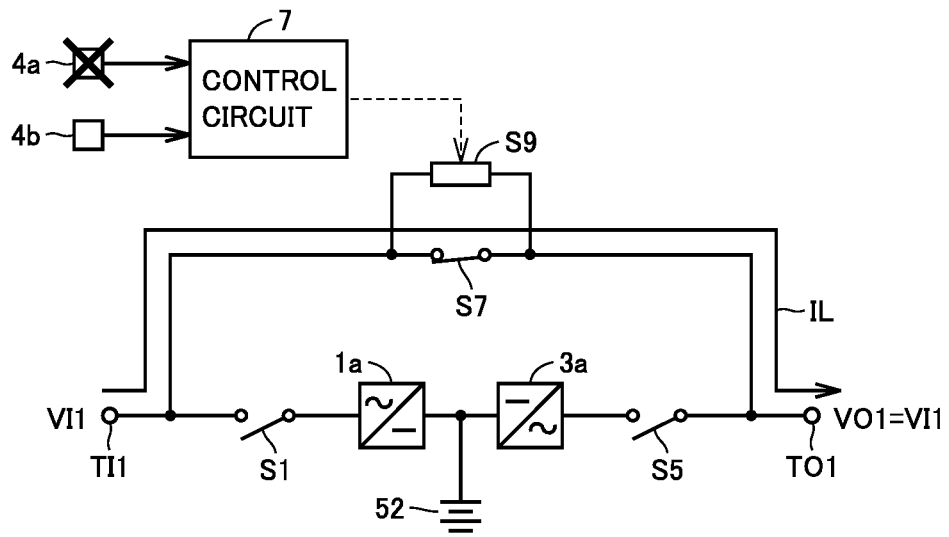

In FIG. 12(a), when voltage VB across terminals of battery 52 decreases and reaches discharge cut-off voltage VBL, the operation of inversion circuit 3a is stopped. In this case, since the phase of VO1 and the phase of VI1 do not necessarily match with each other, semiconductor switch S9 cannot be turned on, so that power supply to load 53 is stopped for a moment.

In FIG. 12(b), switch S7 is turned on while switch S5 is turned off. Then, current IL flows from commercial AC power supply 51 into load 53 through input terminal TI1 switch S7 and output terminal TO1. In this way, in the comparative example, when an abnormality occurs in voltage detector 4a, supply of the two-phase AC power to load 53 is instantaneously interrupted.

As described above, in the present first embodiment, when an abnormality occurs in voltage detector 4a, inverter 3 is controlled in synchronization with output signal VI2D from voltage detector 4b to cause the phases of output voltages VO1 and VO2 from inverter 3 to match with the phases of AC voltages VI1 and VI2, respectively. Then, semiconductor switches S9, S10 and switches S7, S8 are turned on while switches S5 and S6 are turned off. Accordingly, even when an abnormality occurs in voltage detector 4a, the two-phase AC voltage can be supplied to load 53 without instantaneous interruption.

Second Embodiment

In the first embodiment, when an abnormality occurs in voltage detector 4a, inverter 3 is controlled using output signal VI2D from voltage detector 4b in place of output signal VI1D from voltage detector 4a In contrast, in the present second embodiment, a preliminary voltage detector 4d is provided. Thus, when an abnormality occurs in voltage detector 4a, inverter 3 is controlled using an output signal VI1DA from preliminary voltage detector 4d in place of output signal VI1D from voltage detector 4a.

Figure 13:
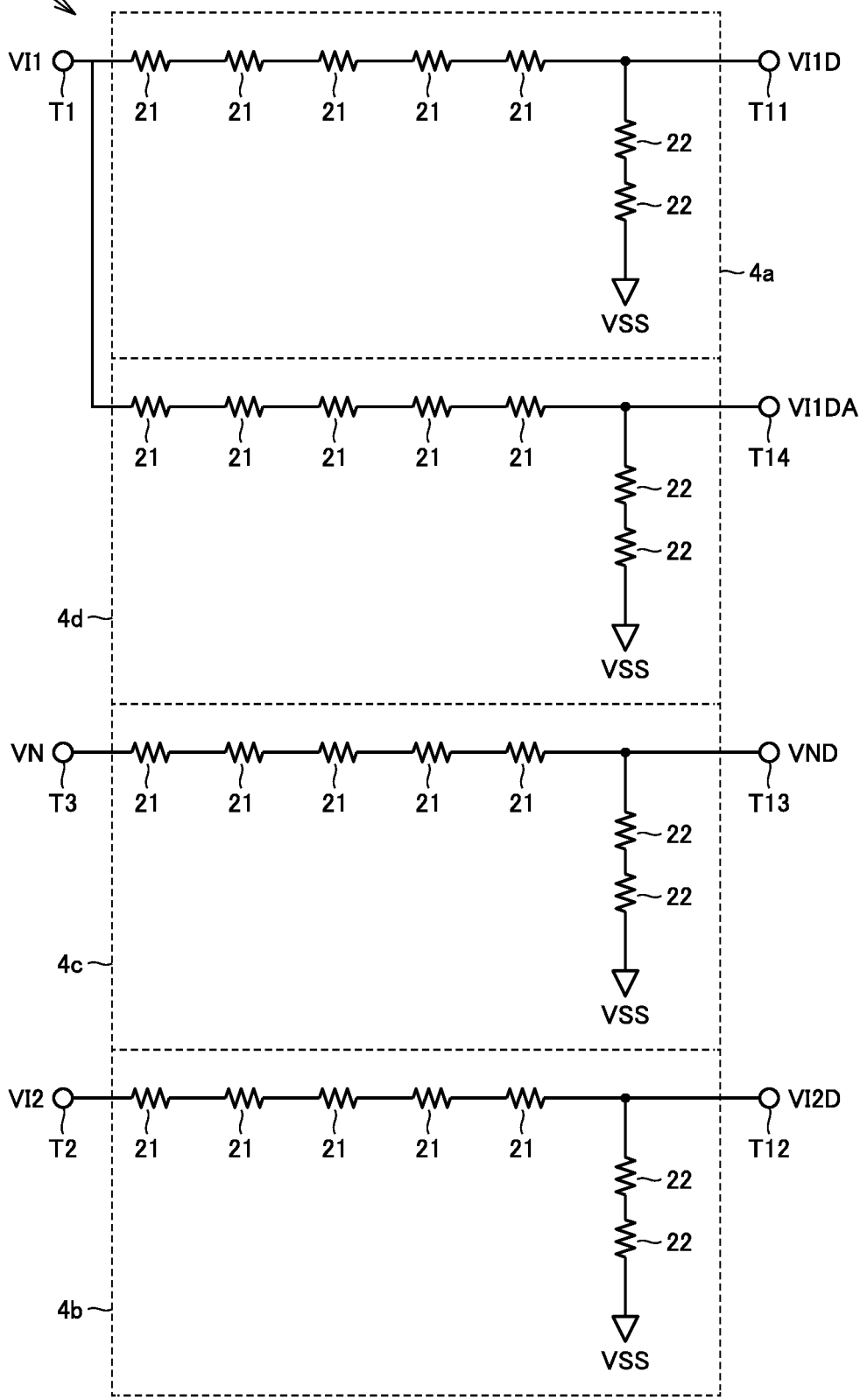
FIG. 13 is a circuit block diagram showing the configuration of an input voltage detection circuit included in an uninterruptible power supply device according to the second embodiment of the present invention.

FIG. 13 is a circuit diagram showing the configuration of an input voltage detection circuit 4A included in an uninterruptible power supply device according to the second embodiment of the present invention, and illustrated as compared with FIG. 3. Referring to FIG. 13, this input voltage detection circuit 4A is different from input voltage detection circuit 4 in FIG. 3 in that it additionally includes preliminary voltage detector 4d and output terminal TI4.

Voltage detector 4d includes a plurality of (five in the figure) resistance elements 21 connected in series between input terminal T1 and output terminal T14, and a plurality of (two in the figure) resistance elements 22 connected in series between output terminal TI1 and the line of reference voltage VSS. An AC voltage VI1DA, which is obtained by dividing AC voltage VI1 by a prescribed voltage dividing ratio, appears on output terminal TI4. AC voltage VI1D is the same as AC voltage VI1D appearing on output terminal TI1. Voltages VI1D, VI2D, VND, and V 1 DA on output terminals TI1, TI2, TI3, and TI4 are supplied to control circuit 7A as output signals from voltage detectors 4a, 4b, 4c, and 4d, respectively.

Figure 14:
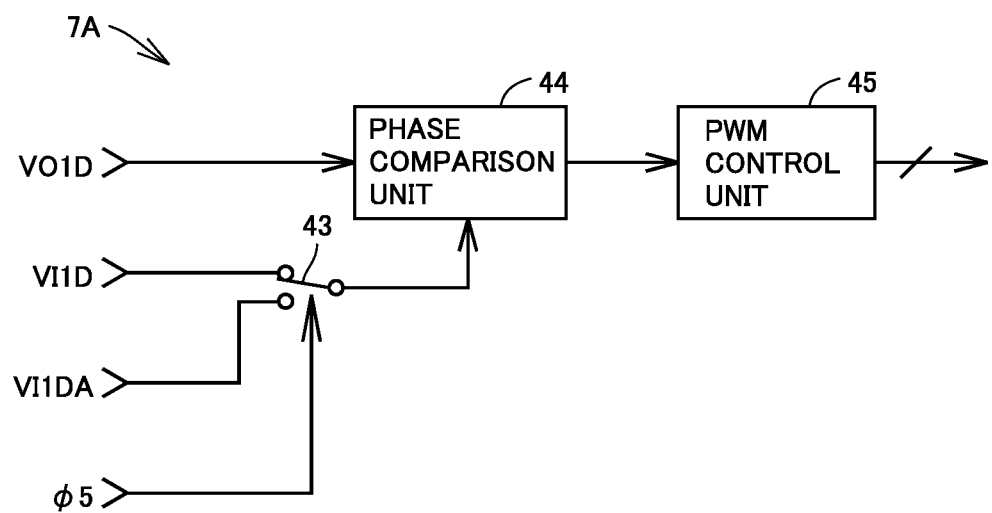
FIG. 14 is a circuit block diagram showing a main part in a control circuit included in the uninterruptible power supply device illustrated in FIG. 13.

FIG. 14 is a block diagram showing a main part in control circuit 7A, and illustrated as compared with FIG. 7. Referring to FIG. 14, control circuit 7A is different from control circuit 7 in FIG. 7 in that it does not include phase conversion unit 41 and switching circuit 42.

Switching circuit 43 receives output signal VI1D from voltage detector 4a and output signal VI1DA from preliminary voltage detector 4d. Then, when abnormality detection signal ϕ5 is turned into an "L" level since voltage detector 4a normally functions, switching circuit 43 supplies signal VI1D to phase comparison unit 44. When abnormality detection signal ϕ5 is turned into an "H" level since an abnormality occurs in voltage detector 4a, switching circuit 43 supplies signal VI1DA to phase comparison unit 44. Since other configurations and operations are the same as those in the first embodiment, the description thereof will not be repeated.

In the present second embodiment, when an abnormality occurs in voltage detector 4a, inverter 3 is controlled in synchronization with output signal VI1DA from preliminary voltage detector 4d to cause the phases of output voltages VO1 and VO2 from inverter 3 to match with the phases of AC voltages VI1 and VI2, respectively. Then, semiconductor switches S9. S10 and switches S7. S8 are turned on while switches S5, S6 are turned off. Accordingly, even when an abnormality occurs in voltage detector 4a, the two-phase AC voltage can be supplied to load 53 without instantaneous interruption.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

TI1 to TI3, T1 to T3, T21 to T23 input terminal, TB1, TB2 battery terminal, TO1 to TO3, TI1 to TI4, T31 to T33 output terminal, S1 to S8 switch, S9, S10 semiconductor switch, 1 converter, 1a, 1b rectification circuit, L1 DC positive bus, L2 DC negative bus, L3 DC neutral point bus, C1, C2, 12, 14, 16, 18 capacitor, 2 bidirectional chopper, 3 inverter. 3a, 3b inversion circuit, 4, 4A input voltage detection circuit, 4a to 4d. 6a to 6c voltage detector, 5 abnormality detector, 6 output voltage detection circuit, DT1 to DT3 DC voltage detector, 7, 7A control circuit, Q1 to Q8 transistor, D1 to D8 diode, 11, 13, 15, 17 reactor, 21, 22 resistance element, 31, 32 effective value calculator, 33 subtractor, 34 absolute value calculator, 35 comparator, 41 phase conversion unit, 42, 43 switching circuit, 44 phase comparison unit, 45 PWM control unit, 51 AC power supply, 52 battery, 53 load.

The invention claimed is:

1. An uninterruptible power supply device of a two-phase three-wire type, the uninterruptible power supply device comprising:
    a converter configured to convert a two-phase AC voltage supplied from a commercial AC power supply into a DC voltage;
    an inverter configured to convert the DC voltage generated by the converter or a DC voltage supplied from a power storage device into a two-phase AC voltage, and supply the two-phase AC voltage to a load;
    a bypass switch pair having one terminal pair receiving the two-phase AC voltage from the commercial AC power supply and the other terminal pair connected to the load;
    a semiconductor switch pair connected in parallel to the bypass switch pair;
    a first voltage detector and a second voltage detector each configured to detect an instantaneous value of the two-phase AC voltage from the commercial AC power supply, and generate an output signal indicating a detected value;
    an abnormality detector configured to determine whether the first voltage detector normally functions or not, and generate an output signal indicating a determination result; and
    a control circuit configured to control the uninterruptible power supply device based on the output signals from the first voltage detector and the second voltage detector and the output signal from the abnormality detector,
    i) when the first voltage detector normally functions, the control circuit being configured to:
        turn off the bypass switch pair and the semiconductor switch pair; and
        control the converter and the inverter in synchronization with the output signal from the first voltage detector,
    ii) when an abnormality occurs in the first voltage detector, the control circuit being configured to:
        stop an operation of the converter;
        control the inverter in synchronization with the output signal from the second voltage detector to convert the DC voltage from the power storage device into a two-phase AC voltage, and to match a phase of the two-phase AC voltage with a phase of the two-phase AC voltage from the commercial AC power supply;
turn on the bypass switch pair and the semiconductor switch pair when a voltage across terminals of the power storage device decreases and reaches a predetermined voltage; and
turn off the semiconductor switch pair after a lapse of a predetermined time period.

2. The uninterruptible power supply device according to claim 1, wherein
a phase of the output signal from the first voltage detector and a phase of the output signal from the second voltage detector are shifted from each other by a predetermined angle, and
when an abnormality occurs in the first voltage detector, the control circuit is configured to:
generate a monitor signal that is obtained as a result of shifting the phase of the output signal from the second voltage detector by the predetermined angle; and
control the inverter in synchronization with the generated monitor signal to convert the DC voltage from the power storage device into a two-phase AC voltage, and to match a phase of the two-phase AC voltage with the phase of the two-phase AC voltage from the commercial AC power supply.

3. The uninterruptible power supply device according to claim 1, wherein
when a difference between an effective value of the output signal from the first voltage detector and an effective value of the output signal from the second voltage detector exceeds a predetermined threshold value, the abnormality detector is configured to determine that an abnormality occurs in the first voltage detector.

4. The uninterruptible power supply device according to claim 1, wherein
based on the output signal from the second voltage detector, the control circuit is configured to determine whether supply of the two-phase AC voltage from the commercial AC power supply is stopped or not, and
when the control circuit determines that supply of the two-phase AC voltage from the commercial AC power supply is stopped, the control circuit is configured to stop the operation of the converter while continuing an operation of the inverter, and convert the DC voltage from the power storage device into a two-phase AC voltage.

5. An uninterruptible power supply device of a two-phase three-wire type, the uninterruptible power supply device comprising:
a converter configured to convert a two-phase AC voltage supplied from a commercial AC power supply into a DC voltage;
an inverter configured to convert the DC voltage generated by the converter or a DC voltage supplied from a power storage device into a two-phase AC voltage, and supply the two-phase AC voltage to a load;
a bypass switch pair having one terminal pair receiving the two-phase AC voltage from the commercial AC power supply and the other terminal pair connected to the load;
a semiconductor switch pair connected in parallel to the bypass switch pair;

a first voltage detector and a second voltage detector each configured to detect an instantaneous value of an AC voltage in one phase of the two-phase AC voltage from the commercial AC power supply, and generate an output signal indicating a detected value;
a third voltage detector configured to detect an instantaneous value of an AC voltage in the other phase of the two-phase AC voltage from the commercial AC power supply, and generate an output signal indicating a detected value; and
an abnormality detector configured to determine whether the first voltage detector normally functions or not, and generate an output signal indicating a determination result; and
a control circuit configured to control the uninterruptible power supply device based on the output signals from the first voltage detector, the second voltage detector and the third voltage detector and the output signal from the abnormality detector,
i) when the first voltage detector normally functions, the control circuit being configured to:
turn off the bypass switch pair and the semiconductor switch pair; and
control the converter and the inverter in synchronization with the output signal from the first voltage detector,
ii) when an abnormality occurs in the first voltage detector, the control circuit being configured to:
stop an operation of the converter;
control the inverter in synchronization with the output signal from the second voltage detector to convert the DC voltage from the power storage device into a two-phase AC voltage, and to match a phase of the two-phase AC voltage with a phase of the two-phase AC voltage from the commercial AC power supply,
turn on the bypass switch pair and the semiconductor switch pair when a voltage across terminals of the power storage device decreases and reaches a predetermined voltage; and
turn off the semiconductor switch pair after a lapse of a predetermined time period.

6. The uninterruptible power supply device according to claim 5, wherein
when a difference between an effective value of the output signal from the first voltage detector and an effective value of the output signal from the third voltage detector exceeds a predetermined threshold value, the abnormality detector is configured to determine that an abnormality occurs in the first voltage detector.

7. The uninterruptible power supply device according to claim 5, wherein
based on the output signal from the third voltage detector, the control circuit is configured to determine whether supply of the two-phase AC voltage from the commercial AC power supply is stopped or not, and
when the control circuit determines that supply of the two-phase AC voltage from the commercial AC power supply is stopped, the control circuit is configured to stop the operation of the converter while continuing an operation of the inverter, and converts the DC voltage from the power storage device into a two-phase AC voltage.

* * * * *